US008526764B2

United States Patent
Knee

(10) Patent No.: US 8,526,764 B2
(45) Date of Patent: Sep. 3, 2013

(54) RE-SIZING IMAGE SEQUENCES

(75) Inventor: Michael James Knee, Petersfield (GB)

(73) Assignee: Snell Limited, Hampshire (GB)

( * ) Notice: Subject to any disclaimer, the term of this patent is extended or adjusted under 35 U.S.C. 154(b) by 470 days.

(21) Appl. No.: 12/743,129

(22) PCT Filed: Nov. 17, 2008

(86) PCT No.: PCT/GB2008/051079
§ 371 (c)(1),
(2), (4) Date: Aug. 10, 2010

(87) PCT Pub. No.: WO2009/063256
PCT Pub. Date: May 22, 2009

(65) Prior Publication Data
US 2010/0303384 A1  Dec. 2, 2010

(30) Foreign Application Priority Data

Nov. 16, 2007 (GB) .................................. 0722498.3
May 23, 2008 (GB) .................................. 0809408.8

(51) Int. Cl.
*G06K 9/32* (2006.01)
*G06K 15/02* (2006.01)

(52) U.S. Cl.
USPC .......................................... 382/298; 358/1.2

(58) Field of Classification Search
USPC ................... 382/298–300, 305, 312; 358/1.2
See application file for complete search history.

(56) References Cited

U.S. PATENT DOCUMENTS

| | | | | |
|---|---|---|---|---|
| 4,789,930 A | * | 12/1988 | Sones et al. | 378/207 |
| 5,923,042 A | * | 7/1999 | Mietta et al. | 250/559.06 |
| 6,563,964 B1 | | 5/2003 | Hallberg | |
| 7,747,107 B2 | * | 6/2010 | Avidan et al. | 382/298 |
| 8,023,153 B2 | * | 9/2011 | Bernal et al. | 358/3.06 |

FOREIGN PATENT DOCUMENTS

| | | |
|---|---|---|
| EP | 0254644 | 1/1988 |
| EP | 0959625 | 11/1991 |
| EP | 0521559 | 1/1993 |
| EP | 1026630 | 8/2000 |
| EP | 1870852 | 12/2007 |
| JP | 5012443 | 1/1993 |
| JP | 7334690 | 12/1995 |
| WO | 0028730 | 5/2000 |

OTHER PUBLICATIONS

Avidan, S. et al. "Seam carving for content-aware image resizing" ACM Transactions on Graphics, ACM, US, Jul. 1, 2007, vol. 26, No. 3, pp. 1-10.

(Continued)

*Primary Examiner* — Kanjibhai Patel
(74) *Attorney, Agent, or Firm* — Michael Best & Friedrich LLP

(57) ABSTRACT

To modify the aspect ratio of images in a video sequence, a measure of image energy is provided at or around each pixel, for example by taking differences between adjacent pixels. A minimum energy path of contiguous pixels is then identified which extends across the image from one edge to another, for example vertically if the width of the picture is to be modified. Information concerning the location of a path in one image is used in the identification of a path in the next image, for example by biasing the energy measure of the path. The aspect ratio of each image is then modified by removing or by replicating the minimum energy path of contiguous pixels.

30 Claims, 5 Drawing Sheets

(56) References Cited

OTHER PUBLICATIONS

Knee, M. et al. "White Paper: Aspect Processing—The Shape of Things to Come." 2008 XP 007908406 Retrieved from the Internet: http://www.snellgroup.com/community/documents/support-documenation/white-papers/white-paper-Aspect-Processing.pdf. Retrieved on Aug. 11, 2009.

Wolf, L. et al. "Non-homogeneous Content-driven Video-retargeting." Computer Vision. IEEE 11th International Conference O N, IEEE, PI. Oct. 1, 2007, pp. 1-6.

PCT/GB2008/051079 International Search Report.

European Office Action for Application 08849130.3 dated Jun. 17, 2011 (6 pages).

Dubuisson-Jolly et al., Optimal Polyline Tracking for Artery Motion Compensation in Coronary Angiography, Proc. 6th Intl. Conf. Computer Vision, 1998, pp. 414-419.

United Kingdom Intellectual Property Office Search Report for Application No. 0722498.3 dated Mar. 12, 2008 (3 pages).

United Kingdom Intellectual Property Office Search Report for Application No. 0722498.3 dated Aug. 13, 2008 (4 pages).

\* cited by examiner

RE-SIZING IMAGE SEQUENCES

FIELD OF INVENTION

This invention concerns the re-sizing of an ordered sequence of related images in a manner which depends on the content of the images. One application of the invention is the aspect-ratio conversion of film or video material.

BACKGROUND OF THE INVENTION

It is frequently necessary to change the overall shape of a set of images comprising an image sequence. An example is modification of video material originated with an aspect-ratio (width to height ratio) of 16:9 to enable it be shown on a display device having an aspect ratio of 4:3. In such processing it is usually undesirable to alter the proportions of objects portrayed in the images. Known methods include removing (cropping) material from parts of the images, and applying spatial scaling which varies over the image area so that only objects near to the edge of the images are distorted.

More complex techniques include systems which analyse the image content so as to identify portrayed objects whose spatial proportions must be preserved, and only to scale other parts of the images to achieve the required change in the overall shape of the images.

A particularly interesting technique for re-sizing single images is described in the paper "Seam Carving for Content-Aware Image Resizing" by Avidan and Shamir, published in the Proceedings of the SIGGRAPH conference in August 2007. In this technique a path connecting opposite edges of an image via set of adjacent pixels having a minimum measure of cumulative high-spatial-frequency energy is identified as a "seam". The pixels comprising this seam are then removed from the image, thus reducing the size of the image by one pixel-pitch in the direction orthogonal to the seam. This process is repeated on the processed image so as to identify a second seam, which is also removed; and the process continues until the desired size reduction has been obtained.

By using a measure of minimum high-spatial-frequency energy to identify seam positions, pixels are removed in relatively undetailed areas which are more likely to represent the spaces between portrayed objects, thus minimising the shape distortion of portrayed objects.

The paper also describes how different degrees of size reduction can be applied in the vertical and horizontal directions and how the technique can be extended to deal with expansion of the image size.

However, the application of these techniques to a sequence of related images, such as views of the same scene captured in a time or viewpoint sequence, leads to unpleasant artefacts.

SUMMARY OF THE INVENTION

The invention consists, in one aspect, of a method and apparatus for changing the size of a first image, forming part of a sequence of images, where a low spatial-frequency-energy region is removed from, or enlarged in, the first image, wherein the selection of the region in the first image to be removed or enlarged is biassed towards the position of a low spatial-frequency-energy region in a second image in the sequence.

Advantageously the selection of the region in the first image to be removed or enlarged is biassed towards a motion compensated position of a low spatial-frequency-energy region in a second image in the sequence and the motion compensation compensates for movement between the first and second images.

For image size reduction, low spatial-frequency-energy pixels are deleted and remaining pixels are moved closer together, without changing their respective values, so as to restore a regular sequence of pixel positions.

For image size enlargement low spatial-frequency-energy pixels are replicated and the replicated pixels are inserted adjacent to the said low spatial-frequency-energy pixels so that the original pixels are moved further apart, without changing their respective values, so as to restore a regular sequence of pixel positions.

In a second aspect of the invention a set of pixel shift values dependant upon the location of one or more low-spatial-frequency energy regions is derived for the pixels of one or more images in the sequence so that the translation of input pixels necessary to produce respective changed-size output images is defined by the respective pixel shift values, and the respective images are changed in size by applying the respective pixel shift values to their pixels.

In either aspect the number of images in the sequence may be increased by interpolation of new images prior to the identification of low spatial-frequency-energy regions.

Advantageously the additional images are generated by motion compensated interpolation.

In either aspect low spatial-frequency-energy regions may be identified by analysing a down-sampled version of the image whose size is to be changed.

Suitably the said down-sampling is anisotropic.

Advantageously the down-sampling pitch is longer in the direction orthogonal to the direction of image size reduction.

In either aspect low spatial-frequency-energy regions are identified by analysing a spatially low-pass filtered version of the image whose size is to be changed.

Suitably the said spatially low-pass filter is anisotropic.

Advantageously the cutoff frequency of said anisotropic spatial filter is lower in the direction orthogonal to the direction of image size reduction.

In the second aspect the said pixel shift values may be spatially filtered prior to being used to form a reduced-size image.

Suitably the said spatial filtering is anisotropic.

Advantageously the cutoff frequency of said anisotropic spatial filtering is lower in the direction orthogonal to the direction of image size reduction.

In certain embodiments of the second aspect the said pixel shift values are temporally filtered prior to being used to form a reduced-size image.

Advantageously the temporal filter is motion compensated.

The invention consists, in a third aspect, of a method of processing a sequence of pixel based images, comprising the steps of providing at or around each pixel a measure of image energy and identifying for each image a low energy path of contiguous pixels extending across the image, wherein information concerning the location of a path in one image is used in the identification of a path in the next image of the sequence, wherein the step of identifying for each image a low energy path of contiguous pixels comprises identifying a path along which the sum of measured energy is a minimum, wherein the step of identifying a path along which the sum of measured energy is a minimum comprises the repeated steps of selecting a next pixel in the path to minimise the accumulated measured energy along the path, and wherein a plurality of paths extending in a common direction across the images are identified in a rank order and information concerning the location of a path in one image used in the identification of a path having the same rank order in the next image of the sequence.

BRIEF DESCRIPTION OF THE DRAWINGS

Examples of the invention will now be described with reference to the drawings in which.

DETAILED DESCRIPTION OF THE INVENTION

In order to explain various embodiments of the invention, it is helpful first to describe the analysis of a first image in a sequence of images to find one or more seams.

Suppose that it is necessary to shrink a picture horizontally. Seam carving is applied repeatedly, shrinking the picture by one pixel width at a time. Each pass of the process operates as follows. An energy or activity function is calculated for each pixel in the picture. Typically, this is the sum of absolute differences between the current pixel's luminance value and each of its four neighbours. A seam of minimum energy is then found extending from the top to the bottom of the picture. A seam is a set of connected pixels, one pixel per line, the connection criterion typically being vertical or diagonal adjacency.

The energy of a seam is the sum of the energy values of the pixels in the seam. The minimum-energy seam can be found using a recursive technique in which best partial seams leading to each pixel on successive rows of the picture are calculated until a minimum-energy seam is found leading to each pixel on the bottom row. The minimum is then taken of all the bottom-row results with back-tracking along the seam to the top of the picture.

Having found the minimum-energy seam, all its pixels are (in one arrangement) simply removed from the picture, shifting the rest of the picture into the gap to make a new picture one pixel narrower than before. This is the process of "carving" a seam from the picture.

Figure 1:
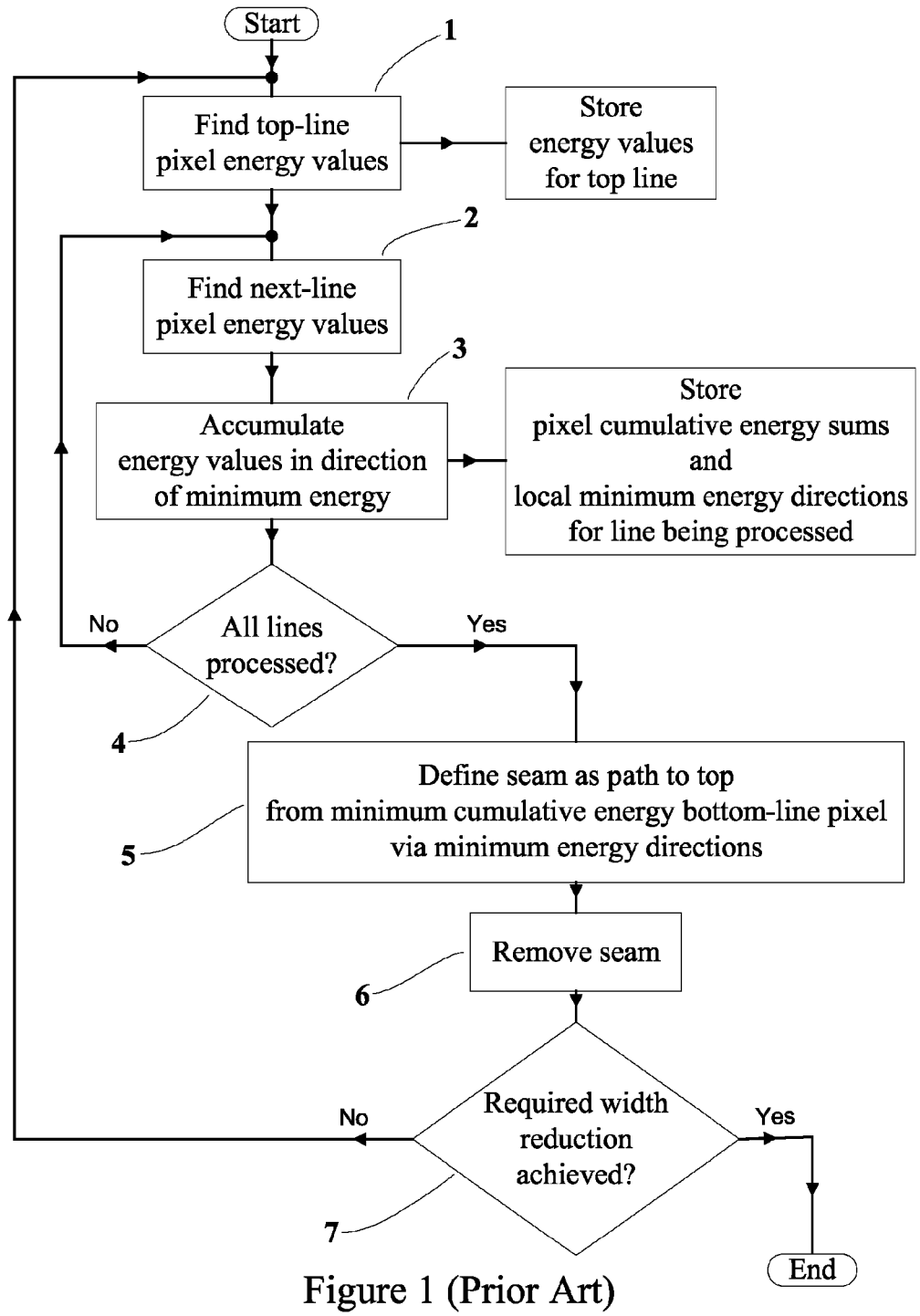
FIG. 1 shows a flow-chart of a prior-art method of reducing the width of a sequence of images.

FIG. 1 shows such a system for finding a substantially vertical seam as a first step in the reduction in the width of the image. As explained in the introduction, the system is based on evaluating the cumulative high-spatial-frequency energy of a set of adjacent pixels. If the luminance of the pixel located at Cartesian co-ordinates (x, y) is $Y_{(x, y)}$, where x and y are in units of horizontal and vertical pixel pitch respectively, a measure of its high-spatial-frequency energy is the sum of the magnitudes of the luminance differences with respect to adjacent pixels:

$|Y_{(x,y)}-Y_{(x-1,y+1)}|+$ $|Y_{(x,y)}-Y_{(x,y+1)}|+$ $|Y_{(x,y)}-Y_{(x+1,y+1)}|+$ $|Y_{(x,y)}-Y_{(x-1,y)}|+$ $|Y_{(x,y)}-Y_{(x+1,y)}|+$ $|Y_{(x,y)}-Y_{(x-1,y-1)}|+$ $|Y_{(x,y)}-Y_{(x,y-1)}|+$ $|Y_{(x,y)}-Y_{(x+1,y-1)}|$

This is the simplest measure for an orthogonal sampling lattice, other combinations of pixel values giving a measure of high-spatial-frequency energy of the pixel at (x, y) may be used; for example the rectified output of a spatial high-pass filter.

Referring to FIG. 1, in step (1) the high-spatial-frequency energy of each pixel in the top line of the image is evaluated. Note that, as there are no pixels above the top line, the energy level will need to be suitably weighted (by a factor of ⅝ if the above measure is used) so as to give values which are directly equivalent to those of pixels fully surrounded by adjacent pixels.

In step (2) the high-spatial-frequency energy of each of the pixels of the next (i.e. second from top) line of the image is evaluated. In step (3), for each pixel of the second from top line, three energy sums are formed:

a) The energy sum of the pixel and the adjacent pixel directly above it.

b) The energy sum of the pixel and the adjacent pixel above and to the left of it.

c) The energy sum of the pixel and the adjacent pixel above and to the right of it.

The minimum of these three energy sums is stored respectively for each second-line pixel. The position of the spatially higher pixel contributing to the sum relative to the position of the spatially lower pixel contributing to the sum is also stored. There are three possible relative positions: vertical, case (a); diagonal from left, case (b); or diagonal from right, case (c).

In step (4) a test is made to determine whether all lines of the image have been processed. As this is not the case, the third line from the top of the image is then processed in a similar way summing the third-line pixel energy values with the appropriate first- and second-line energy sums. In this way a minimum cumulative energy path from the top line of the image is determined.

The process continues until the bottom line of the image has been processed, and step (4) then directs the processing to step (5). In step (5) the bottom line pixel with the lowest cumulative energy is determined; the set of pixels whose energy values contributed to its cumulative energy are identified; and, the set of their locations stored as a seam. This seam will trace a one-pixel-wide path from a point on the top edge of the image to a point on the bottom edge of the image. It may contain vertical and or diagonal segments and will pass between high-energy regions of the image.

In step (6) the pixels of this seam are removed from the image, thus reducing its width. In step (7) the reduced image width is compared with the required width and, if further reduction is required, the processing returns to step (1), and the partially reduced image is then processed in the same way as described above so as to identify a second seam; which is also removed. This process is repeated until the required width reduction is achieved and step (7) causes the process to end.

In a first embodiment of the invention the images of a sequence of images are reduced in width by the successive removal of seams from each image. Artefacts due to inconsistencies between the seam positions in succeeding image are avoided by applying a recursive bias to the pixel energy values. Bias values, which depend on the positions of seams in the preceding image, are subtracted from the pixel energy values used to determine the seam locations in the current image, so that pixels which correspond in position with seams in the preceding image of the sequence have their energy contributions to the cumulative energy measures reduced. Because the seam determination process seeks a low-energy path through the image, pixels whose energy contribution are reduced by bias are more likely to be included in newly determined seams.

The recursion will preferably be motion compensated recursion, so that the bias favours placing a seam where the corresponding seam in the previous picture would have been expected to have moved to.

As explained previously, seams are identified in sequence, with removal of the pixels of each seam prior to the determination of the next seam. The sequence of seam determination (for a particular image) gives a rank order for each seam. The bias values used in the determination of seam positions are derived from the position of the seam of the same rank in the previous image.

Figure 2:
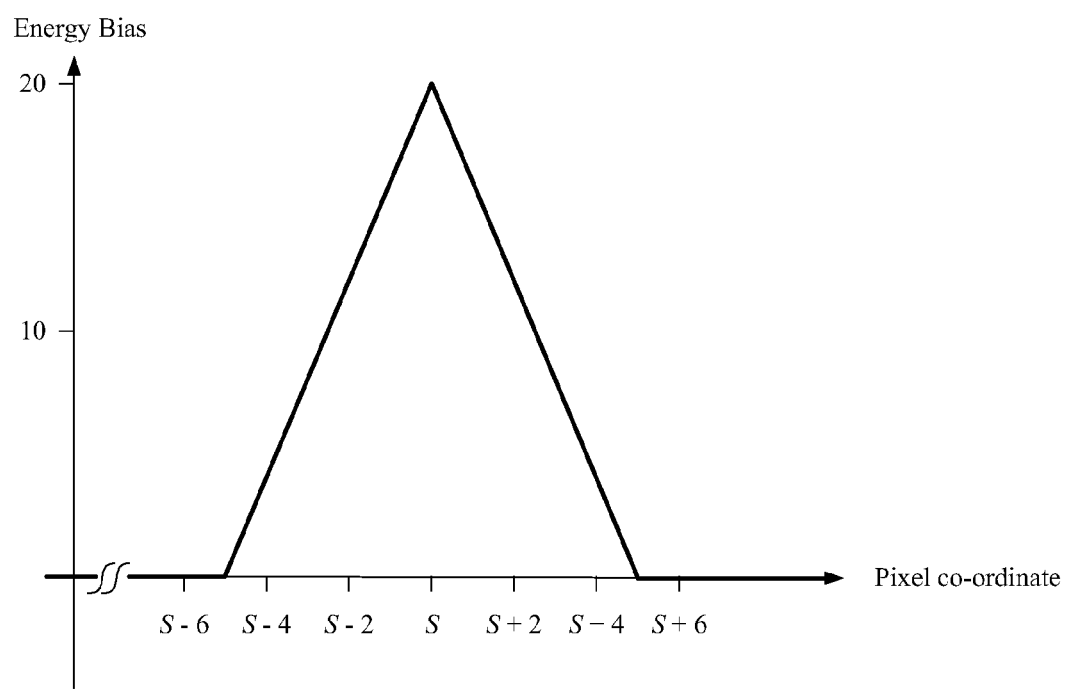
FIG. 2 shows a graph of energy bias versus pixel position.

A suitable bias function is shown in FIG. 2, which shows the bias values to be subtracted from pixels close to the position of a seam in the preceding image. Referring to FIG. 2, the relevant seam in the previous image (i.e. the seam of the same rank as the seam being identified) crosses the line being processed at pixel co-ordinate S. Current-image pixels in the co-ordinate range S−4 to S+4 have energy values of between 1 and 20 subtracted from their energy value contributions to the respective cumulative energy sum, the highest bias being applied to pixels closest to co-ordinate value S.

Figure 3:
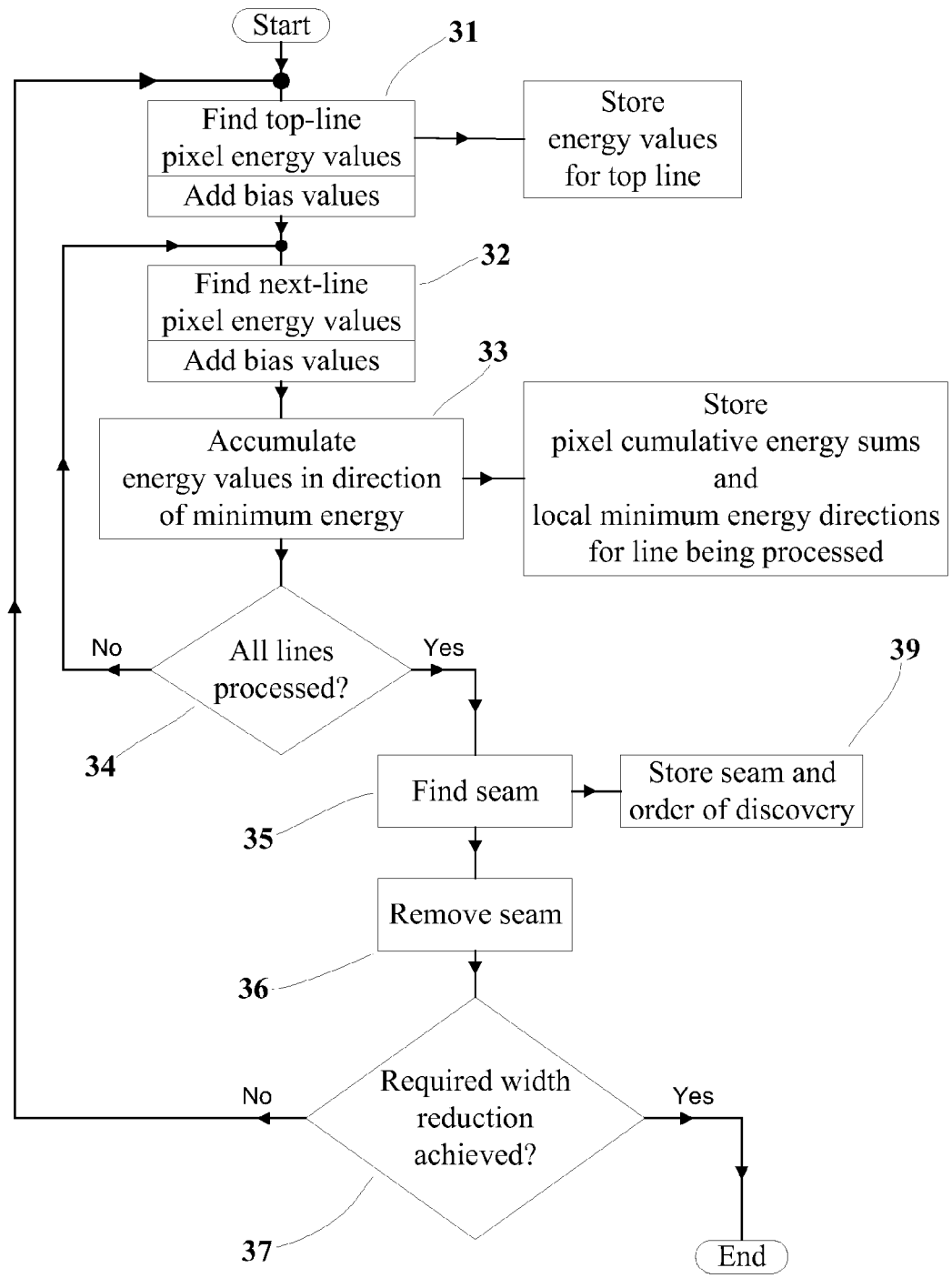
FIG. 3 shows a flow-chart of a method of reducing the width of a sequence of images according to an embodiment of the invention.

A width reduction process making use of recursive energy bias according to the invention is shown in FIG. 3. Steps which have similarity with steps in FIG. 1 have equivalent reference numerals prefixed by 3. Steps which differ from the system of FIG. 1 will now be described with reference to FIG. 3.

After determining the top-line pixel energy values at step (31) and the next-line pixel energy values at step (33), the respective pixel energy value has a respective energy-bias value subtracted from it. The bias value is determined from the position of the pixel being processed relative to the position of the seam of the same rank (i.e. order of discovery) in the same line of the previous image of the sequence. Higher bias values are subtracted from pixels which are closest to the position of the equivalent seam in the same line of the previous image.

In order to find the bias values it is necessary to store the location and rank of each seam as it is discovered. This is shown at step (39).

Other factors may contribute to the bias values so as to improve the process. For example if an area of interest has been determined, pixels within this area could be given additional bias so as to prevent seams passing through the area of interest. Also, the removal of pixels from linear features portrayed in the image can be subjectively annoying—such features may be detected and bias applied to pixels close to, and forming part of, such linear features.

Instead of subtracting the bias values, a bias-dependant multiplicative, or non-linear weighting can be applied to the pixel energy values that contribute to the cumulative energy sums from which seam positions are determined.

The previously-described processes for finding seams require the processing of all the pixels of each image. However it is also possible to determine seam positions on spatially down-sampled images; i.e. where fewer pixels are used to represent the content of each image. This has the advantage that fewer pixels need be processed, but, of course, additional processing will usually be necessary to down-sample the images. It is particularly helpful to apply down-sampling in the direction orthogonal to the required direction of image size reduction. Fewer pixels are processed, but the positional resolution (in the direction of size reduction) of seam locations is not reduced. Where such anisotropic down sampling is used it is also beneficial to modify the pixel energy determining function so as to compensate for the loss of high-spatial-frequency energy that occurs in the down-sampling. For example, where width reduction is required, and more severe down-sampling is applied in the vertical direction, greater weight can be given to vertical pixel-value differences in determining the pixel energy values.

Where seam positions are calculated in down-sampled images, suitable sub-pixel interpolation may be necessary to determine the corresponding seam positions in the full-resolution images.

The use of seam positions from the previous image is clearly inappropriate where succeeding images are unrelated. This condition may be detected, by any of the known methods of "shot-change detection", and seam information from unrelated preceding images not used to determine seam positions.

Temporal filtering of seam positions may be used to improve the consistency of seam positions between succeeding images so that more than one preceding image contributes to the seam positions for the current image. Motion compensation may also be used so that the movement of objects portrayed by pixels is analysed and, where a seam is found in a moving area, the position of that seam in a succeeding image may be inferred from the measured speed and direction of movement (motion vector) for that image area.

The consistency of determined seam positions from one image to the next may be improved by interpolating one or more additional images between adjacent input images and performing the seam location process on the resulting temporally up-converted sequence. Motion compensated interpolation can be used to create the additional intermediate images.

The process of seam location can be used for image expansion. Instead of removing the seam pixels, they can be duplicated so that the size of each image is increased by one pixel for every seam. The process of seam location can be iterated in a similar way as described for image reduction until sufficient seams have been located to achieve the required degree of expansion.

In an alternative embodiment of the invention the process of re-sizing the images is achieved by a pixel shifting process rather than the direct removal or duplication of seam pixels. The control of the pixel shifting process is derived from seam positions calculated in the same way as for the previously-described embodiments. The seam carving can then be regarded as a process that generates a map function linking input and output pixel locations—effectively a set of instructions for a rendering engine. This map function can then be manipulated by filtering, scaling or mixing to make the seam carving process smoother and also to enable the seam carving analysis to be performed on a down-sampled picture to save computation.

Figure 4:
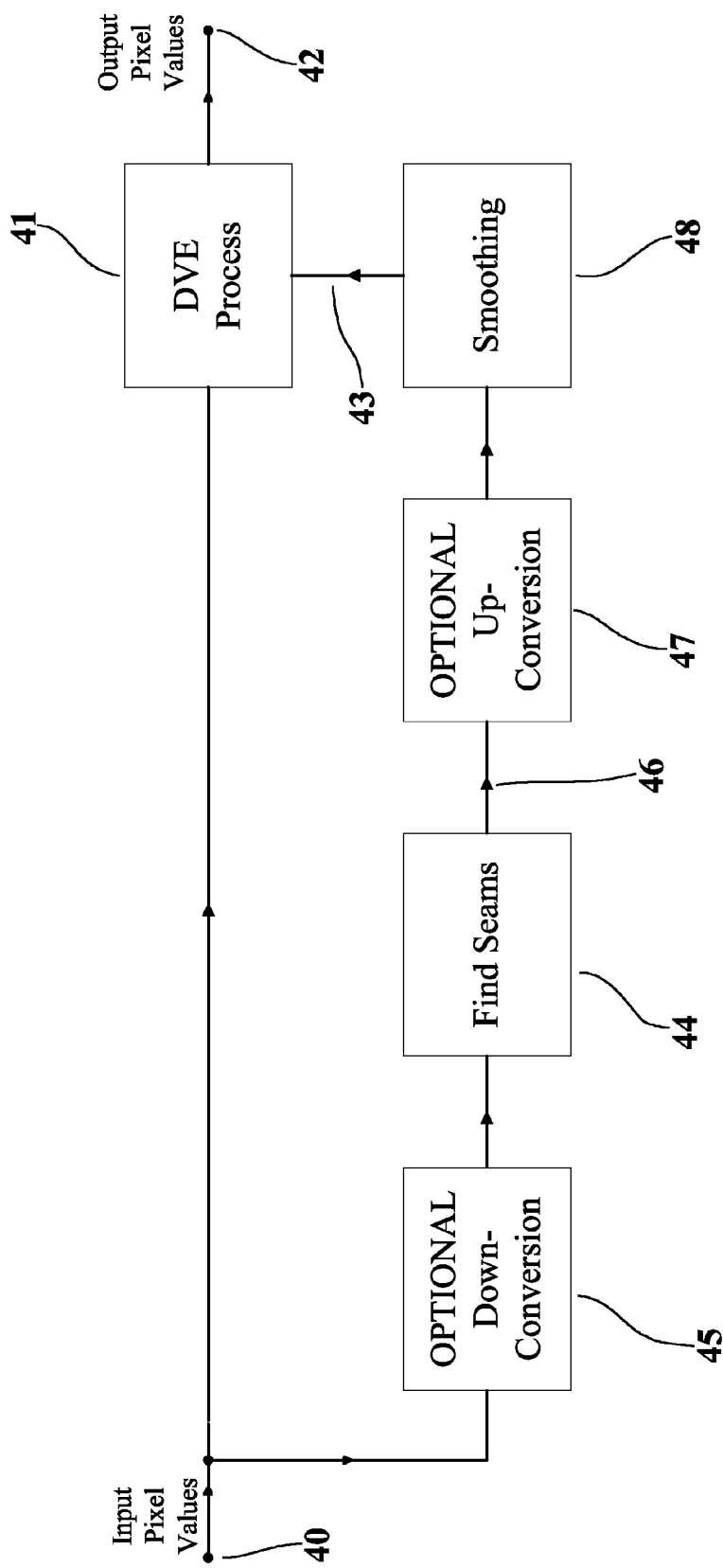
FIG. 4 shows a block diagram of a method of reducing the width of a sequence of images according to an embodiment of the invention.

A block diagram of the alternative embodiment is shown in FIG. 4.

Referring to FIG. 4, a stream of pixel values (40), which define an image sequence, is input to a digital video effects (DVE) processor (41), whose output (42) comprises a reduced-size image sequence. The DVE processor uses the known techniques of digital video effects, including variable spatial interpolation and decimation, to create output pixels from respective input pixels defined by pixel shift control signals (43). The pixel shift control signals (43) may vary between different pixels of an image and between succeeding images of the sequence. The value of each output pixel of each output image is defined, by pixel shift control signals (43), in terms of shifted input pixels of the respective input image; and, there are fewer output pixels (42) than input pixels (40).

A seam-finding process (44) determines seam positions for each image in the sequence from the input pixel-value stream (40). Optionally, the input pixels can be spatially down-sampled in a down-conversion block (45) so as to simplify the seam finding process as described above for the first embodiment. The seam-finding process (44) operates as described previously, except that, because seam pixels are not removed once seams have been identified, means must be provided to prevent pixels from already-located seams (low rank seams) from contributing to the energy sums used to locate later (higher rank) seams.

The output (46) of the seam finding process (44) is, for each image in the sequence, a table linking each output pixel position to an input pixel position. This table is derived by taking account of all the seams found in the relevant image (the number of seams to be found depending on the required width reduction) and calculating horizontal pixel shift values which, when applied to the pixels, have the same effect as removing seam pixels from the image. An alternative format for this table would be a vector field where each output pixel is assigned a vector indicating the distance and direction to the corresponding input pixel. For width reduction all the vertical components of these vectors will be zero.

The spatial resolution of the output (46) from the seam-finding process (44) may be lower than the output pixel resolution. This is very likely if the input image is down sampled in the optional down-sampling block (45). If so, the table of shift values (46) is up-sampled in an up-conversion process (47) which uses any of the known methods of spatial interpolation to obtain a shift value for every output pixel location.

As mentioned previously annoying artefacts are caused when the re-sizing of succeeding images is inconsistent. These artefacts can be reduced by filtering the shift values in a smoothing process (48). This processing can be spatial and/or temporal low-pass filtering. A particular advantage of the system of FIG. 4 is that lower resolution in the seam-finding process can be compensated for by the smoothing process (48). This enables a reduction in processing resources for an equivalent output quality.

Additional arbitrary expansion or contraction factors can be obtained by processing the pixel-shift table values (46), and this will now be explained with reference to FIG. 5. The Figure shows an exemplary set of pixel-shift table values in the form of a graph (50) of input pixel co-ordinate i versus the corresponding output pixel co-ordinate x. A set of $X_C$ output pixels are obtained by shifting a sub-set of the I input pixels. Those input pixels which correspond to seams are labelled S1 to S11 in the Figure, and these pixels have no corresponding output pixels. As can be seen from the graph (50), suitable shift values are applied to the contributing pixels so as to provide a regularly-spaced set of output pixels.

(Note that seams have been numbered for convenience in ascending order from the co-ordinate origin. These seam numbers do not correspond to the seam rank described above; as explained previously, the seam rank relates to the sequence of seam identification and is unrelated to the co-ordinate of the seam.)

The set of pixel-shift values represented by the graph (50) can be used to create an alternative set of shift values which can be applied to the images to expand them. Such a set of image expansion shift values is illustrated by the graph (51), in which each of the seam pixels has been duplicated, so as to create a set of $X_E$ output pixels from the full set of I input pixels.

In the graph (50) one pixel has been removed per seam; and, in the graph (51) one pixel has been added per seam. For example, the three adjacent input pixels P Q and R include a seam pixel Q (one of the pixels of seam S6). In the reduced-size image produced by the shift values of the graph (50), pixel Q is discarded and pixels P and R are moved next to each other. In the expanded image produced by the shift values of the graph (51), pixel Q is duplicated to form pixels $Q_1$ and $Q_2$; and these duplicated pixels are interposed between pixels P and R.

If the graphs (50) and (51) are represented by the functions:

$C=(x)$ and $i=E(x)$ respectively it can be seen that these functions are mutual reflections, in the x direction, about the line i=x.

Figure 5:
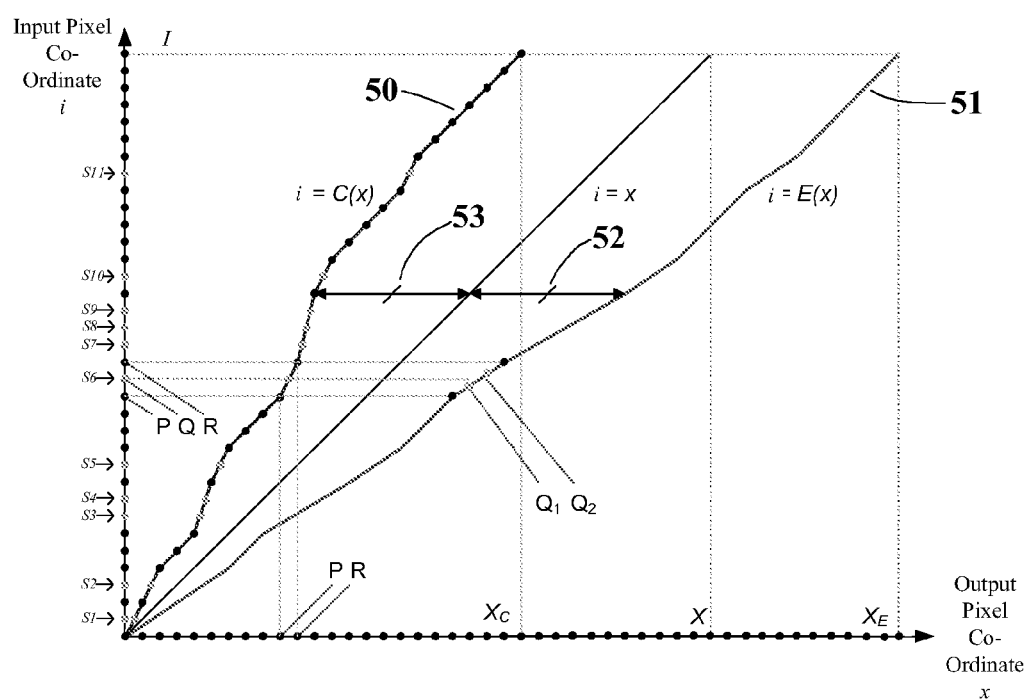
FIG. 5 shows graphs of input pixel co-ordinates versus equivalent output pixel co-ordinates.

If we define equivalent inverse functions (i.e. functions which express output pixel co-ordinate in terms of input pixel co-ordinate):

$x=C^{-1}(i)$ and $x=E^{-1}(i)$ respectively we can express this mirror-symmetry by saying:

$E^{-1}(i)-x=x-C^{-1}(i)$ where the left hand side of the above equation represent the length of the line (52) in FIG. 5; and, the right hand side the above equation represent the length of the line (53).

Image expansion factors greater than that provided by the graph (51) can be achieved by functions E(x) for which:

$x-C^{-1}(i)>E^{-1}(i)-x$

More generally, the required transformation of the pixel-shift values should satisfy the equation:

$\alpha \times [x-C^{-1}(i)]=(1-\alpha)\times[E^{-1}(i)-x]$ where α is a parameter which determines the degree of expansion.

Positive values of α less than unity will give size increase less than one pixel per seam.

Negative values of α define pixel shift functions giving image size reduction; in this case the graph of shift values E(x) lies to the left of line i=x in FIG. 5.

Suitable transformations, corresponding to the above equations, can be applied to the pixel-shift values for the one pixel per seam size reduction case C(x) so as to obtain pixel-shift values for arbitrary image expansion or reduction independent of the number of seams located.

The transformation of the pixel-shift data from the seam location process need not give rise to integer shift values. Sub-pixel interpolation can be used in the DVE process (41) where the values of pixels located on either side of the (non-integral) required input pixel co-ordinate are used to compute the output pixel value.

The transformation of the pixel-shift data from the seam location process can vary, depending upon the position within the image. For example, spatial distortions could be confined to the image edge regions. Where this is done it will be necessary to ensure that sufficient and equal expansion or reduction is applied to every line of each image.

The processes which have been described are equally applicable to image height modification. In this case substantially horizontal seams are identified corresponding to low cumulative high-spatial-frequency energy paths between points on the left and right edges of the images.

Height and width modification can be combined by identifying both horizontal and vertical seams. The horizontal and vertical seam finding processes can be conducted in stages so that a proportion of the total required number of seams in one direction can be found, then a proportion of the required seams in the other direction, and this alternation of analysis direction can continue until the required number of seams in each direction is found. If both horizontal and vertical seam positions are known then the image may be expanded in one direction and reduced in another.

Non-rectangular images can be processed. In this case it is necessary to weight the cumulative energy measures according to the number of pixels comprising each seam so that seams are identified and ranked according to the cumulative high-spatial-frequency energy per pixel.

Other directions of image expansion or reduction can be obtained by changing the permitted directions in which the cumulative energy is summed in the seam location process. For example, if size modification in a diagonal direction is required, the choice of pixel energy summations could be:

a) The energy sum of the pixel and the adjacent pixel directly above it.
b) The energy sum of the pixel and the adjacent pixel above and to the left of it.
c) The energy sum of the pixel and the horizontally adjacent pixel to the left of it.

The term "motion compensation" has been used in this specification on the understanding that it is very common for the position of an image in a sequence to represent time. However, analogous processing can be applied where the position in the sequence represents some other dimension, such as camera position. References to motion compensation should therefore be taken to include compensation for positional shifts of portrayed objects between images due to a non-temporal parameter which defines the position of an image in the sequence.

In the processes described above, all seams have equal effect; i.e. they all cause the same change in picture height or width. An alternative approach is to take note of the amount of energy removed from the picture by each seam in the original analysis phase. This energy value then determines the width of picture material that is actually removed. The first few seams will 'carve through' the plainest, lowest-energy areas of the picture, so we remove more picture material from these areas. For example the energy value associated with each seam could be processed in a non-linear function to obtain a width-change value to be applied to the picture at the location of that seam. Low energy value seams would correspond to large width changes and high energy value seams would correspond to smaller width changes. The set of width changes for all the processed seams can be scaled so that the total width change, obtained by summing the set of width changes, is equal to the required width change.

In the first, previously-described width changing process, the width change corresponds to an integral number of pixels—one pixel for each seam; and the process of seam location stops once the desired size change has been achieved. However, if the effect of each seam depends on the total energy of that seam a chosen arbitrary number of seams can be found, and the resulting picture shift values scaled to obtain the required picture size change.

A fixed number of seams could be found so as to limit the amount of processing required, or there could be as many seams as the number of pixels per picture width (for width change) or picture height (for height change).

As explained previously, in the seam finding process, the minimum-energy seam is found and removed in an iterative process. The first seams to be removed have low energy, and then the energy increases because lower energy pixels have been removed. The increase is not always strictly monotonic, because, once a seam is removed, the energy is recalculated throughout the picture. The problem is that, towards the end of the seam carving process, some seams will be removed while others of approximately similar energy will remain. This leads to inconsistent results between succeeding pictures in a sequence, with consequent motion judder when the sequence is viewed. A solution to this problem is to make the width of picture material actually removed from the output picture inversely proportional to the seam energy, and then to scale the resulting pixel shift values in order to bring about the desired size change.

This can be expressed mathematically as follows:

$$w_i = \frac{A}{E_i}, i = 1 \ldots N$$

where:
$w_i$ is the width of material removed along the path of seam i;
$E_i$ is the energy of seam i;
A is a constant; and,
N is the width of the picture in pixel-pitch units The constant A can be chosen so as to ensure a desired total width of removed material. For example, if we wish to reduce the width of the picture from N to M, then A is given by $$A = \frac{N-M}{\sum_{i=1}^{N} 1/E_i}$$

Note that it is important to use an energy function that cannot be equal to zero.

In practice, it is desirable to limit the maximum width of picture material removed by a single seam. This could be achieved by adding a constant to the energy function:

$$w_i = \frac{A}{E_i - E_{min} + A/w_{max}}, i = 1 \ldots N$$

Unfortunately, this function does not permit a closed-form solution for the constant A. An approximation to the desired behaviour could be obtained using the following function:

$$w_i = \frac{A}{E_i + B}, i = 1 \ldots N$$

A value of the new constant B is determined empirically, and then A is given by $$A = \frac{N-M}{\sum_{i=1}^{N} \frac{1}{E_i + B}}$$

A further refinement to the function is to subtract a constant and clip to 0, so that seams with energy values above some maximum bring no reduction in width:

$$w_i = \max\left\{0, \frac{A}{E_i + B} - \frac{A}{E_{max} + B}\right\}, i = 1 \ldots N$$

A is then given by $$A = \frac{N - M}{\sum_{i=1}^{N} \max\left\{0, \frac{1}{E_i + B} - \frac{1}{E_{max} + B}\right\}}$$

An advantage with the use of this function is that the seam carving process can be stopped when the energy reaches $E_{max}$, since energy values at or higher than $E_{max}$ give rise to width reduction values of 0.

An alternative to the reciprocal function and its refinements discussed above is to use a decreasing linear function of energy:

$$w_i = w_{max}\left(\max\left\{0, 1 - \frac{E_i}{E_{max}}\right\}\right)$$

If $E_{max}$ is fixed, then $w_{max}$ is given by $$w_{max} = \frac{N - M}{\sum_{i=1}^{N} \max\left\{0, 1 - \frac{E_i}{E_{max}}\right\}} = \frac{N - M}{\sum_{E_i < E_{max}} 1 - \frac{E_i}{E_{max}}}$$

Whilst the above examples have been based on 16:9 to 4:3 conversion, the inventive concepts apply equally to conversion in the other direction and between other ratios.

The improvements that we have made to seam carving for video sequences allow a great deal of flexibility. We can perform seam carving independently in both horizontal and vertical dimensions and combine the resulting maps. We can use seam carving to expand or contract the picture in either or both dimensions. For example, Figure A 12 shows the result of seam carving both horizontally and vertically, the aim this time being to retain the 16:9 aspect ratio but to produce a smaller picture in which objects of interest retain their original size and shape. In this example, the smooth seam carving approach is not used, so the first pictures show the "hard" horizontal and vertical seams that are removed from the picture.

The invention claimed is:

1. A method in an image processor of changing the size of a first image, forming part of a sequence of images, the method comprising the steps of:
   selecting a low spatial-frequency-energy region in the first image; and
   removing or enlarging the selected low spatial-frequency-energy region in the first image,
   wherein the selection of the region in the first image to be removed or enlarged is biased towards the position of a low spatial-frequency-energy region in a second image in the sequence.

2. A method in an image processor of changing the size of a first image, forming part of a sequence of images, the method comprising the steps of:
   selecting a low spatial-frequency-energy region in the first image; and
   removing or enlarging the selected low spatial-frequency-energy region in the first image,
   wherein the selection of the region in the first image to be removed or enlarged is biased towards the position of a low spatial-frequency-energy region in a second image in the sequence, and
   where the selection of the region in the first image to be removed or enlarged is biased towards a motion compensated position of a low spatial-frequency-energy region in a second image in the sequence and the motion compensation compensates for movement between the first and second images.

3. A method of image size reduction according to claim 1 where low spatial-frequency-energy pixels are deleted and remaining pixels are moved closer together, without changing their respective values, so as to restore a regular sequence of pixel positions.

4. A method of image size enlargement according to claim 1 where low spatial-frequency-energy pixels are replicated and the replicated pixels are inserted adjacent to the said low spatial-frequency-energy pixels so that the original pixels are moved further apart, without changing their respective values, so as to restore a regular sequence of pixel positions.

5. A method in an image processor of changing the size of a first image, forming part of a sequence of images, the method comprising the steps of:
   selecting a low spatial-frequency-energy region in the first image; and
   removing or enlarging the selected low spatial-frequency-energy region in the first image,
   wherein the selection of the region in the first image to be removed or enlarged is biased towards the position of a low spatial-frequency-energy region in a second image in the sequence, and
   where a set of pixel shift values dependant upon the location of one or more low-spatial-frequency energy regions is derived for the pixels of one or more images in the sequence so that the translation of input pixels necessary to produce respective changed-size output images is defined by the respective pixel shift values, and the respective images are changed in size by applying the respective pixel shift values to their pixels.

6. A method according to claim 5 in which the said pixel shift values are transformed in dependence upon the position within the image of the respective pixel to be shifted.

7. A method according to claim 2 where the number of images in the sequence is increased by interpolation of new images prior to the identification of low spatial-frequency-energy regions.

8. A method according to claim 7 where the additional images are generated by motion compensated interpolation.

9. A method according to claim 1 where low spatial-frequency-energy regions are identified by analysing a down-sampled version of an image whose size is to be changed.

10. A method according to claim 9 where the said down-sampling is anisotropic.

11. A method according to claim 10 where the down-sampling pitch is longer in the direction orthogonal to the direction of image size reduction.

12. A method according to claim 1 where low spatial-frequency-energy regions are identified by analysing a spatially low-pass filtered version of an image whose size is to be changed.

13. A method according to claim 12 where the said spatial low-pass filter is anisotropic.

14. A method according to claim 13 where the cutoff frequency of said anisotropic spatial filter is lower in the direction orthogonal to the direction of image size reduction.

15. A method according to claim 5 where the said pixel shift values are spatially filtered prior to being used to form a reduced-size image.

16. A method according to claim 15 where the said spatial filtering is anisotropic.

17. A method according to claim 16 where the cutoff frequency of said anisotropic spatial filtering is lower in the direction orthogonal to the direction of image size reduction.

18. A method according to claim 5 where the said pixel shift values are temporally filtered prior to being used to form a reduced-size image.

19. A method according to claim 18 where the temporal filter is motion compensated.

20. A method in an image processor of changing the size of an image, the method comprising the steps of:
   processing a set of pixels that represent the image so as to find a low spatial-frequency-energy path between points on opposite edges of the image including a sub-set of the said set of pixels;
   evaluating the total spatial-frequency energy of the said sub-set of pixels;
   using the evaluated total spatial-frequency energy of the said sub-set of pixels to determine the magnitude of a one-dimensional expansion or contraction such that a larger expansion or contraction is applied where the evaluated total spatial-frequency energy of the said sub-set of pixels is lower and a smaller expansion or contraction is applied where the evaluated total spatial-frequency energy of the said sub-set of pixels is higher; and
   applying said expansion or contraction to those parts of the said image that lie on the said path.

21. A method according to claim 20 in which the said total spatial-frequency energy value is used to derive a set of pixel shift values that are applied to a pixel representation of the said image.

22. A method according to claim 21 in which the said total spatial-frequency energy value is modified by a non-linear function before being used to derive the said set of pixel shift values.

23. A method in an image processor of processing a sequence of pixel based images to modify the aspect ratio of the images, the method comprising the steps of:
   providing at or around each pixel a measure of image energy;
   identifying for each image a low energy path of contiguous pixels extending across the image from one edge of the image to a different edge of the image, wherein information concerning the location of a path in one image is used in the identification of a path in the next image of the sequence; and
   modifying the aspect ratio of each image by removing or by replicating said low energy path of contiguous pixels.

24. A method according to claim 23, wherein the step of identifying for each image a low energy path of contiguous pixels comprises identifying a path along which the sum of measured energy is a minimum.

25. A method according to claim 23, wherein the step of identifying a path along which the sum of measured energy is a minimum comprises the repeated steps of selecting a next pixel in the path to minimise the accumulated measured energy along the path.

26. A method according to claim 23, wherein a plurality of paths extending in a common direction across the images are identified in a rank order and information concerning the location of a path in one image is used in the identification of a path having the same rank order in the next image of the sequence.

27. A non-transitory computer-readable medium including instructions for a processor, the instructions implementing a method comprising the steps of:
   providing at or around each pixel a measure of image energy;
   identifying for each image a low energy path of contiguous pixels extending across the image from one edge of the image to a different edge of the image, wherein information concerning the location of a path in one image is used in the identification of a path in the next image of the sequence; and
   modifying the aspect ratio of each image by removing or by replicating said low energy path of contiguous pixels.

28. A non-transitory computer-readable medium according to claim 27, wherein the step of identifying for each image a low energy path of contiguous pixels comprises identifying a path along which the sum of measured energy is a minimum.

29. A non-transitory computer-readable medium according to claim 27, wherein the step of identifying a path along which the sum of measured energy is a minimum comprises the repeated steps of selecting a next pixel in the path to minimise the accumulated measured energy along the path.

30. A non-transitory computer-readable medium according to claim 27, wherein a plurality of paths extending in a common direction across the images are identified in a rank order and information concerning the location of a path in one image is used in the identification of a path having the same rank order in the next image of the sequence.

* * * * *

UNITED STATES PATENT AND TRADEMARK OFFICE
CERTIFICATE OF CORRECTION

PATENT NO.        : 8,526,764 B2
APPLICATION NO. : 12/743129
DATED             : September 3, 2013
INVENTOR(S)       : Michael James Knee Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 555 days.

Signed and Sealed this
Fifteenth Day of September, 2015

Michelle K. Lee
*Director of the United States Patent and Trademark Office*